United States Patent [19]

Nevin

[11] 4,228,435

[45] Oct. 14, 1980

[54] RADAR SENSITIVITY TIME CONTROL USING RANGE GATED FEEDBACK

[75] Inventor: Robert L. Nevin, New Hartford, N.Y.

[73] Assignee: The United States of America as represented by the Secretary of the Air Force, Washington, D.C.

[21] Appl. No.: 5,885

[22] Filed: Jan. 23, 1979

Related U.S. Application Data

[63] Continuation-in-part of Ser. No. 813,572, Jul. 7, 1977, abandoned.

[51] Int. Cl.³ ............................................. G01S 13/00
[52] U.S. Cl. ................................ 343/5 SM; 343/7 A; 343/7 AG
[58] Field of Search ................. 343/5 SM, 7 AG, 7 A

[56] References Cited

U.S. PATENT DOCUMENTS

| 3,149,333 | 9/1964 | Campbell ........................... 343/7 AG |
| 3,196,355 | 7/1965 | Berry et al. ....................... 343/7 AG |
| 3,392,370 | 7/1968 | Neitzel ............................. 340/15.5 R |
| 3,464,022 | 8/1969 | Locheed, Jr. et al. .......... 340/15.5 GC |
| 3,719,942 | 3/1973 | Herman et al. .................... 343/7 A |
| 3,778,829 | 11/1973 | Longuemare, Jr. et al. ..... 343/7 AG |
| 4,058,809 | 11/1977 | Chudleigh, Jr. .................. 343/7 AG |
| 4,159,477 | 6/1979 | Le Beyec .......................... 343/7 A |

Primary Examiner—S. C. Buczinski
Attorney, Agent, or Firm—Joseph E. Rusz; Willard R. Matthews, Jr.

[57] ABSTRACT

A sensitivity time control circuit for radar receivers, using range gated feedback where the video signal is sampled and compared to a desired signal at intervals based upon range sweep; as the radar antenna is reversing direction, integrated averages of the video signal are used to update the sensitivity time controlled waveform.

2 Claims, 7 Drawing Figures

RADAR SENSITIVITY TIME CONTROL USING RANGE GATED FEEDBACK

STATEMENT OF GOVERNMENT INTEREST

The invention described herein may be manufactured and used by or for the Government for governmental purposes without the payment of any royalty thereon.

This is a continuation-in-part of patent application Ser. No. 813,572 now abandoned entitled RADAR SENSITIVITY TIME CONTROL USING RANGE GATED FEEDBACK, filed by Robert L. Nevin, July 7, 1977, now abandoned.

BACKGROUND OF THE INVENTION

This invention relates generally to radar signal processing and more particularly to a system for providing sensitivity time control using range gated feedback.

Ground mapping radar has its own distinct parameters within which it must function. These parameters are distinct and vary in many facets from similar requirements of searching and tracking radar.

In a ground mapping radar system the strength of the reflection from the ground target depends upon the range, target reflectivity and antenna gain. Target reflectivity is normally a function of the grazing angle, which in turn is a function related to the range and aircraft attitude. Antenna gain is a function of what is referred to as the "tilt angle" and the "look down" angle, both of which are functions of the range. A sensitivity time control circuit has as its purpose the controlling of radar receiver gain as a function of range, to provide a uniform response from equal size targets. In currently available radar receivers, the sensitivity time control (STC) is manipulated manually by the operator. The sensitivity time control has a gain control waveform which repeats every range sweep. It begins with a preselected high attenuation at the origin of the sweep and reduces the attenuation linerly as the range increases. Beginning attenuation is set manually by the operator, with some automatic compensation for aircraft altitude. The slope of the waveform is also set manually by the operator. Due to the interaction between these controls and the manual IF gain and the Video gain controls, it is very difficult to adjust the STC and gain controls correctly. In addition, the need for readjustment is frequent. This is particularly disadvantageous where the operator may also have to monitor television and infrared displays simultaneously.

SUMMARY OF THE INVENTION

The invention concerns a radar system which incorporates a Sensitivity Time Control using a range gated feedback. The STC waveform is stored in a digital memory, and during each range sweep it is read out sequentially and reconstructed by a digital-analog converter and integrator. The feedback circuit samples the average video over several range intervals, corresponding to segments of the STC curve. For each selected range interval, the feedback circuit integrates the deviation from the desired average.

At the end of each half-scan, as the antenna is reversing direction, the integrated averages of the video signal are used to up-date the STC waveform. The STC waveform is therefore feedback-controlled at each range interval and self correcting to maintain the proper average video level. This is distinguished from prior systems where the operator must use controls to try to compensate for video gain changes. The invention compensates continuously and automatically, whereby the operator has only to view and interpret the presentation.

It is therefore an object of the invention to provide a sensitivity time control for radar systems with range gated feedback.

It is another object of the invention to provide a sensitivity time control for radar receivers that is more sensitive to changes in reflection from ground targets than existing devices.

It is a further object of the invention to provide a new and improved sensitivity time control that is inexpensive to manufacture and easily maintained.

It is still another object of the invention to provide a new and improved sensitivity time control circuit for radar receivers that provides a uniform response, automatically, regardless of aircraft altitude, antenna tilt angle and average terrain reflectivity.

It is still a further object of the invention to provide a new and improved sensitivity time control circuit for radar receivers that maintains a designated level of response without manual adjustment by an operator.

These together with other objects, features and advantages of the invention will become more readily apparent from the following detailed description taken in connection with the illustrative embodiments in the accompanying drawings.

DETAILED DESCRIPTION OF THE PREFERRED EMBODIMENT

The present invention comprehends the use of a sensitivity time control (STC) feedback circuit in a pulsed radar system of an aircraft to automatically control receiver gain as a function of range so as to provide a uniform response from equal sized targets regardless of the aircraft's altitude, antenna gain, and target reflectivity. The STC circuit comprises a digital memory which reads out sequentially a waveform of the STC circuit during each range sweep, a digital-to-analog (D/A) converter, and an integrator which reconstruct the STC waveform for each range sweep. The STC circuit samples the average video, which is the difference between a measured video voltage and a desired average voltage, from a radar receiver over a range sweep, wherein a range sweep is divided into a plurality of range intervals. The STC produces an STC waveform comprising a plurality of segments wherein each segment corresponds to a range interval. For each range interval, the STC circuit integrates any deviation from a desired average output of the receiver, and this integration sequence follows every range sweep as the antenna scans one way across a sector. At the end of each sweep, the integrator discharges in preparation for the next sweep. As the antenna reverses its direction at the end of each half-scan, the integrated averages are processed by logic circuitry to update or modify automatically the STC waveform. During the updating process, the result of each measurement is used to adjust a point of the STC waveform that coincides in time with the center of the range interval being measured to produce the STC waveform. Thus, a proper average video level is maintained at each range interval by the self-correcting STC feedback circuit, precluding any need for constant operator re-adjustment to compensate for video gain changes.

Figure 1:
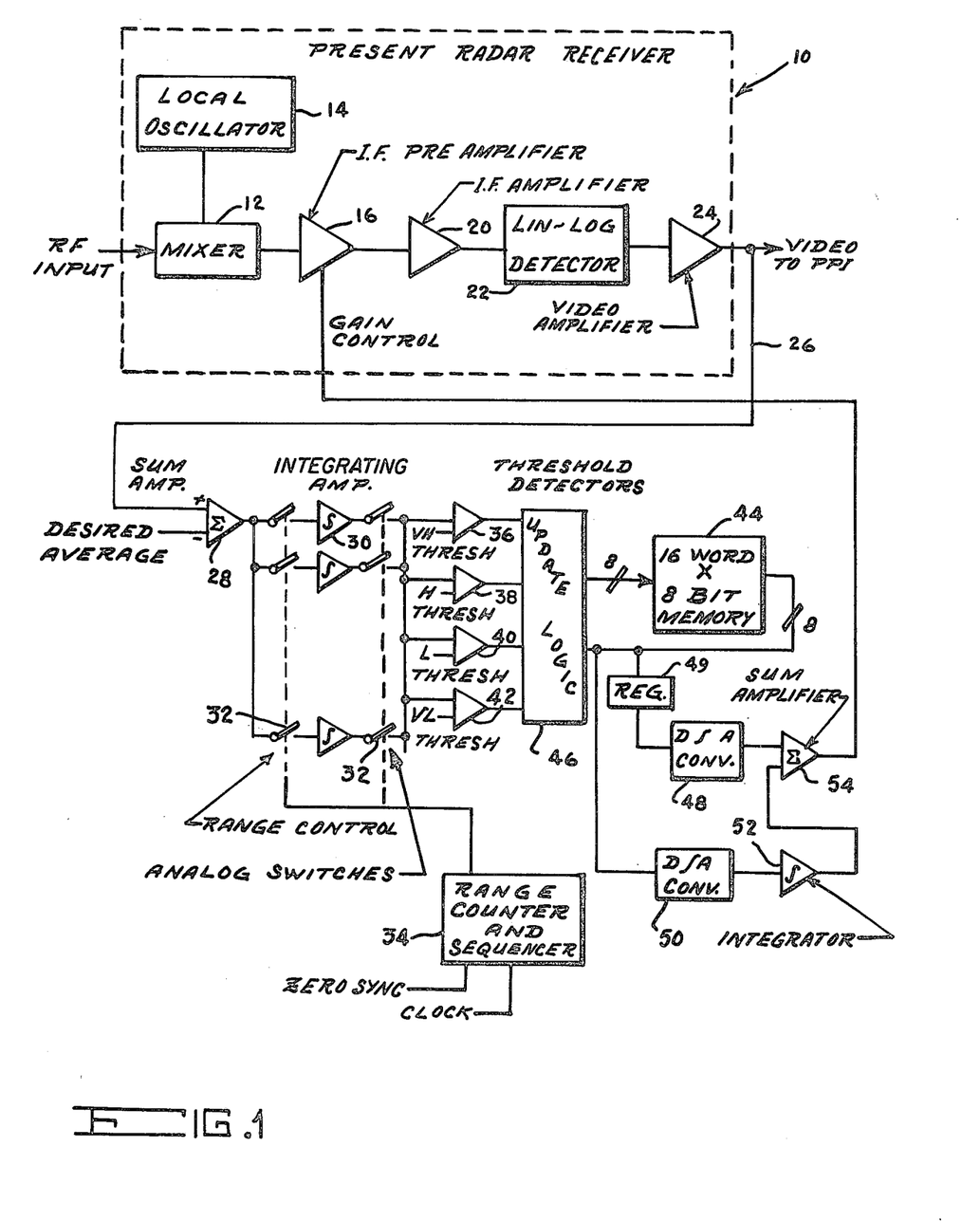
FIG. 1 is a diagrammetric representation of the circuit of the invention.

FIG. 1 is a block diagram of an STC circuit incorporating the principles of the invention. Referring to FIG. 1, a conventional radar receiver is shown, generally at 10. The RF input enters the receiver and is mixed by mixer 12 with a signal from the local oscillator 14 and sent to an IF preamplifier 16. The present STC waveform and manual IF gain control operate on the gain of the IF preamplifier 16. The signal is then amplified by IF amplifier 20 and sent to a logarithmic detector 22 and thence to a video amplifier 24 and out as video to the display tube. Since the circuit necessarily uses a logarithmic detector, gain changes would be made at the IF preamplifier where the effect on the signal is linear.

The invention monitors the video voltage via line 26. The video voltage is fed to a summing amplifier 28 where it is compared to the desired average and the difference voltage produced is supplied to sixteen integrating operational amplifiers 30 through analog switches 32. The switches are operated and controlled by the range counter and sequencer 34.

Figure 2:
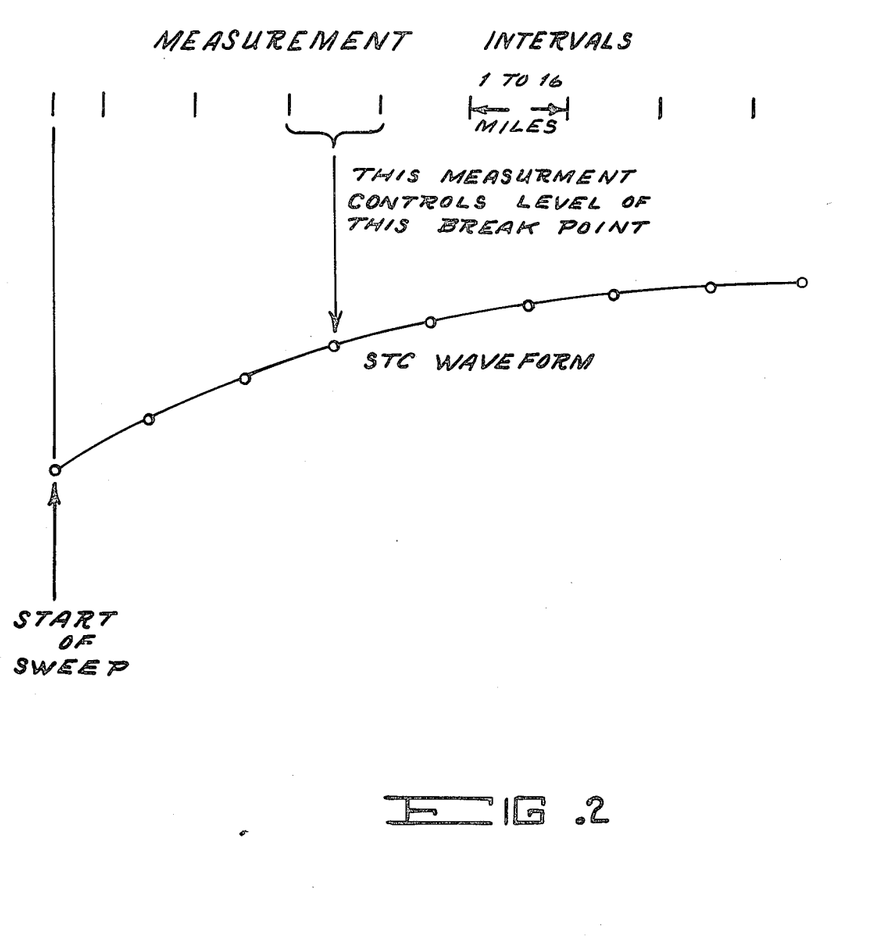
FIG. 2 is a representation of the sensitivity time control waveform.

Each switch is closed in turn for intervals of one to sixteen miles starting from the beginning of each range sweep. The size of the range intervals depends on the mode and range scale of the radar. This integration sequence follows every transmitted pulse as the antenna scans one way across the sector. At the end of the sector, as the antenna is reversing direction, each integrator output is connected to the four threshold detectors (36, 38, 40, 42). As each output is thresholded, the corresponding segment of the STC waveform is corrected. The four thresholds are "Very High" (36), "High" (38), "Low" (40), "Very Low" (42). The attentuation at the proper range will increase or decrease slightly if the "High" or "Low" threshold is passed. It will increase or decrease in a large step if the "Very High" or "Very Low" threshold is passed. The digital memory 44 contains sixteen words of eight bits each. The first word determines the starting voltage of the STC waveform. Each succeeding word determines the slope of the waveform during one time interval. The length of the segment time intervals is equal to that of the measurement time intervals. During the update process controlled by update logic 46, the result of each measurement is used to adjust the point of the STC waveform that coincides in time with center of the measurement interval. Interval timing is shown in FIG. 2. The output of memory 44 is in this manner provided to the update logic 46. That is the update logic acts to adjust the STC curve from its old values to new values in such a way to keep the integrator 30 output voltages between the high threshold (38) and low threshold (40) voltage values. If an integrator output, at the end of a sector scan, exceeds the high threshold, then the curve will be adjusted from its present values to reduce the gain for the corresponding portion of the sweep. This is accomplished by reducing the slope of one segment of the STC curve, and increasing the slope of the following segment by a like amount. Similarly, if the integrator output falls below the low threshold, the gain for that segment will be increased in analogous fashion. The "very high" and "very low" thresholds cause a much larger step to be used, and are provided to allow a fast response when very large errors are encountered. When the thresholds are tripped in the first range bin, an adjustment is made to the baseline, or starting number. An equal but opposite adjustment is made to the second number, which is the slope of the first segment in order to maintain the voltage value at the end of the first segment.

During each operational cycle of the update logic, each range bin is tested in sequence for threshold actuations. The adjustments are then made to bring the gain in that range bin to the proper value. The update logic then tests the next range bin and updates it, etc, for all the range bins.

It is likely that any output slope value will be adjusted twice during an update cycle. The first time would pertain to the range bin in which that slope segment begins, and the second pertains to the following range bin, in which that slope segment ends. The baseline number would be adjusted only once, pertaining to the first range bin.

The measurement process takes place during every half-scan. The integrators are discharged as the antenna is reversing. During the next half-scan, the newly adjusted STC waveform is used, while another set of measurements is taken for updating the waveform at the next turn around.

The waveform is generated by two digital-to-analog (D/A) converters 48, 50, an integrating amplifier 52 and a summing amplifier 54. One D/A converter 48 produces the initial or baseline voltage point as set by the first memory number stored in holding register 49. The other D/A converter 50 produces a voltage proportional to the required slope. The slope voltage is integrated by integrator 52 to produce the slope itself, and summed with the baseline. The slope numbers are supplied in sequence by the memory during every sweep changing at each break point in the waveform. At the end of the sweep, the slope integrator is discharged in preparation for the next sweep.

Figure 3:
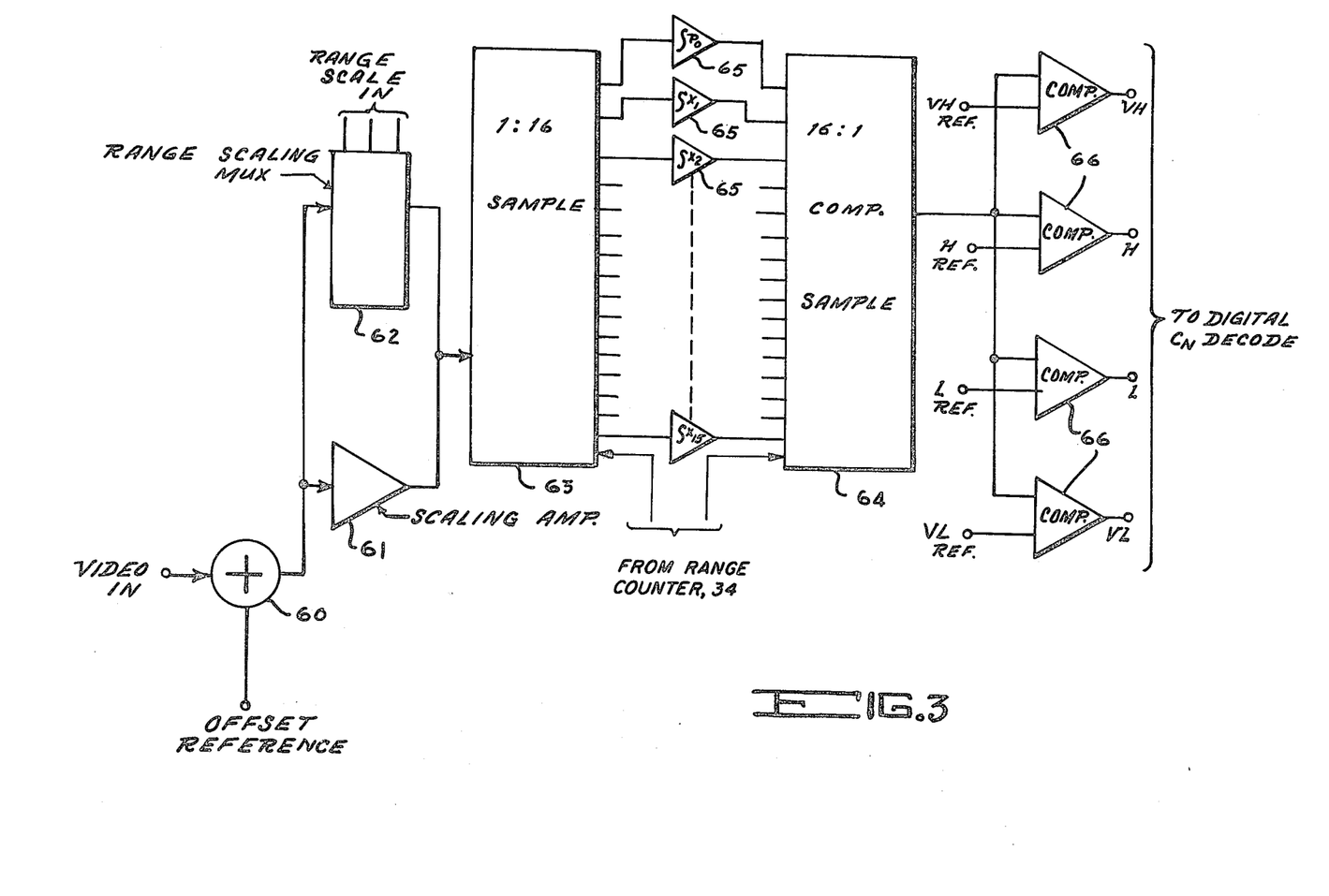
FIG. 3 is a schematic diagram of the analog STC input section of one presently preferred embodiment of the invention.
Figure 4:
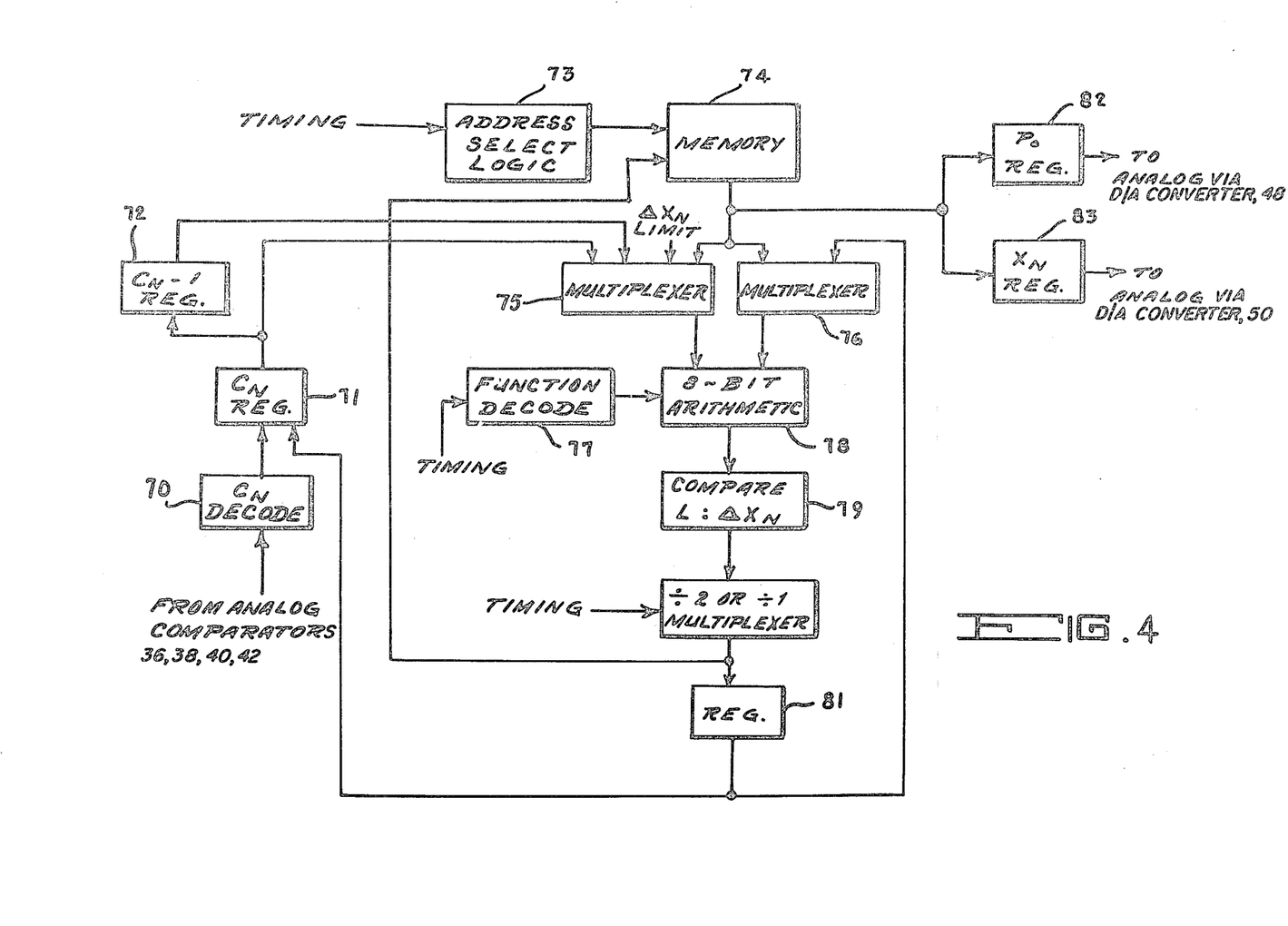
FIG. 4 is a schematic diagram of the STC update logic section of the embodiment of FIG. 3.
Figure 5:
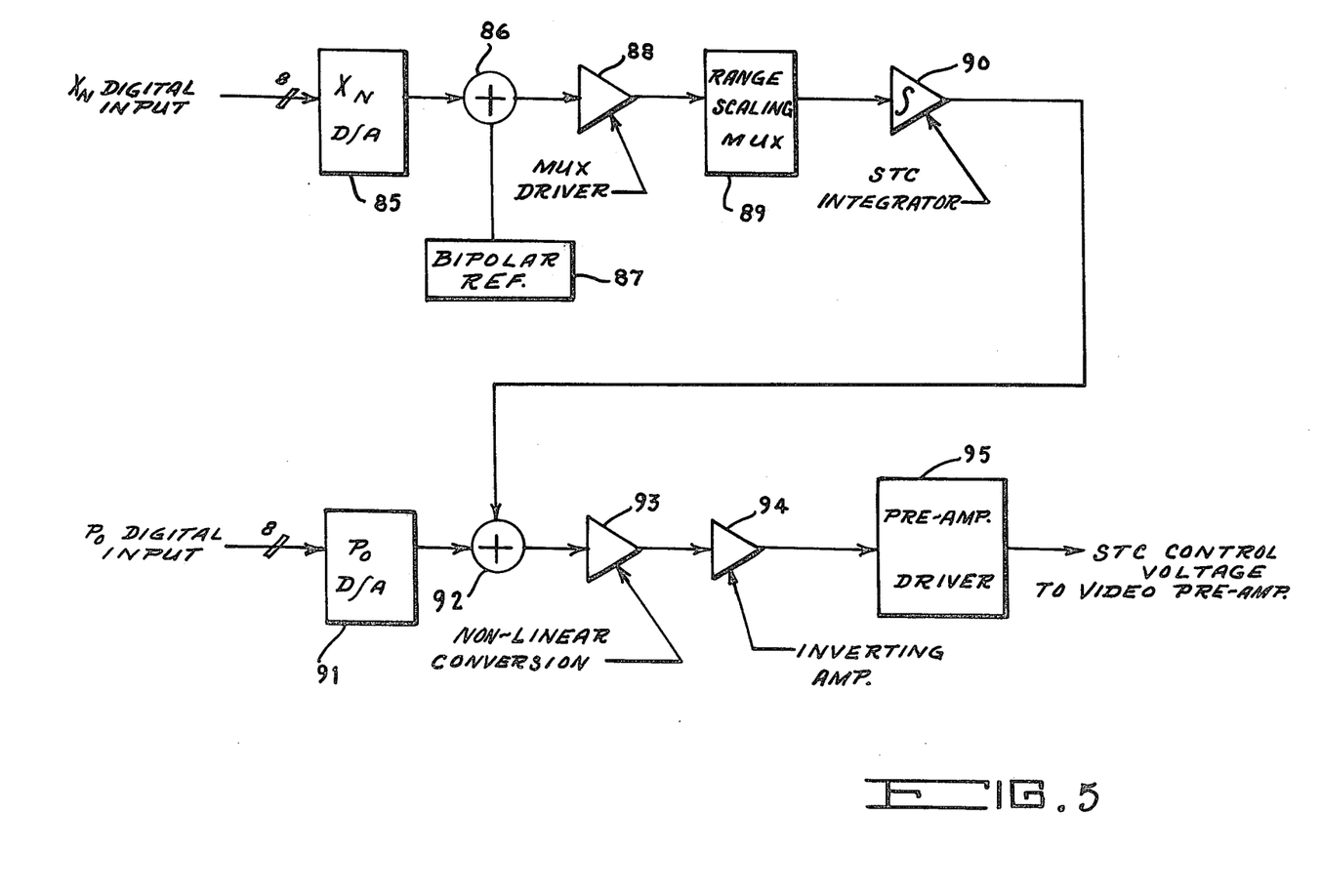
FIG. 5 is a schematic diagram of the analog STC output of the embodiment of FIGS. 3 and 4.

By way of example one particular implementation of the invention is illustrated by the schematic diagrams of FIGS. 3, 4 and 5. FIG. 3 shows the analog STC input section of the embodiment and comprises summing means 60, scaling amplifier 61, range scaling multiplexer 62, input switching 63, output switching 64, integrating amplifier 65 and comparators 66. This portion of the circuit operates in the manner described above and the outputs of comparator 66 actuate the correction decoder of the update logic portion of the circuit in accordance with the particular comparator thresholds crossed.

Figure 6:
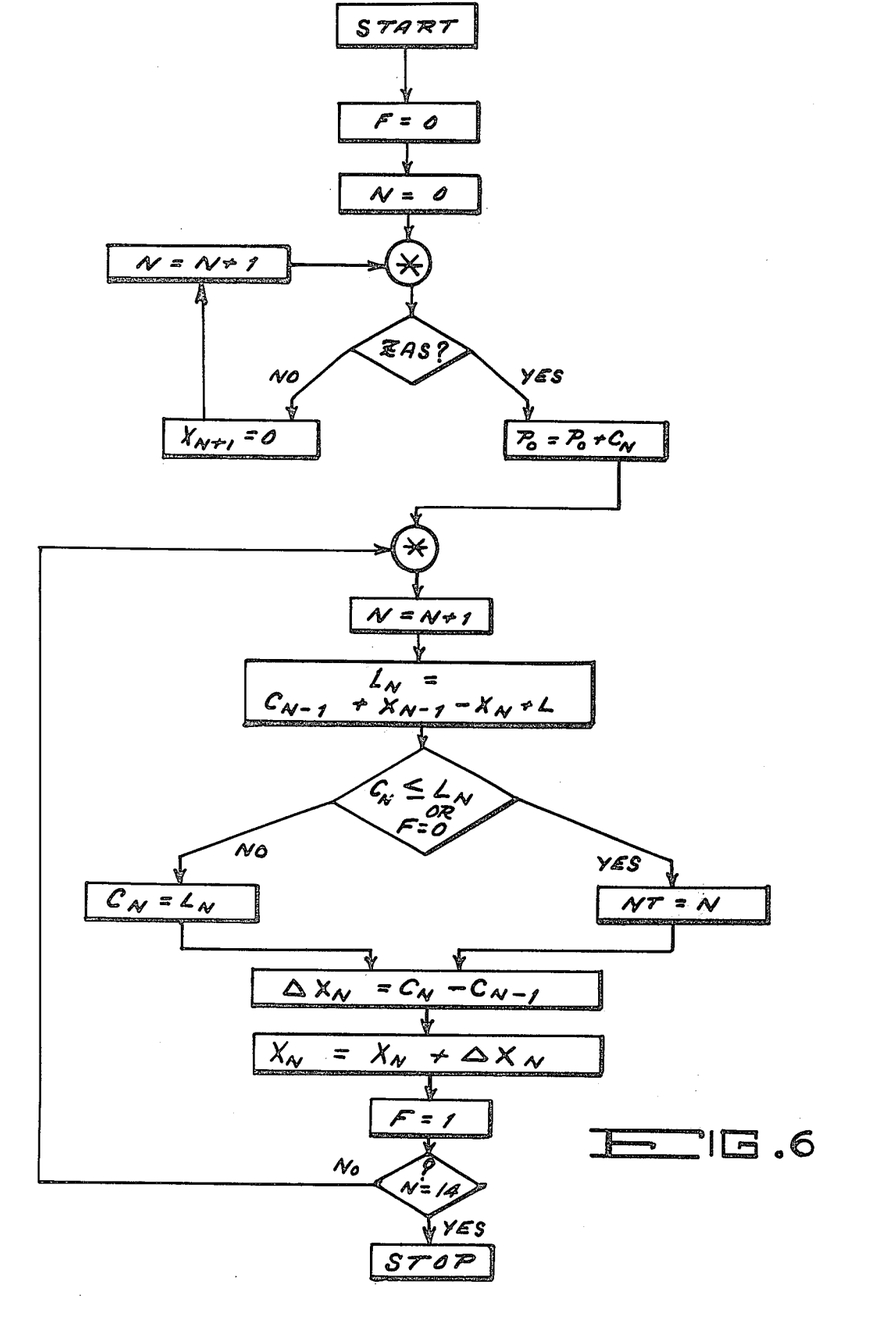
FIG. 6 is a flow chart for generating the various functions of the invention.

The STC update logic portion of the circuit shown in FIG. 4 performs the various arithmetic and logic functions specified above. Although the update logic of the present example is shown as a discrete circuit all functions required can be programmed into a conventional micro-processor. An algorithm in the form of a flow chart is shown in FIG. 6 which can be used to develop the various functions required for programming. The following is a table of the symbol definitions used in the flow chart of FIG. 6.

TABLE I

| | |
|---|---|
| F | indicator which is zero for the first pass through the full loop |
| N | number of range cell |
| * | wait for next range cell |
| ZAS | zero altitude sync passed |
| $X_n$ | STC slope in Nth range cell |
| $C_n$ | Correction required in Nth cell; initially a result of input threshold; for later cells modified by inflection limit |
| L | limit on upward change of slope |
| $L_n$ | upper limit of correction due to inflection limit L |
| NT | value of N at toe of beam. During update last value entered will stay for ½ scan. |

Referring now to FIG. 4, the update logic circuit shown thereby comprises decoder 70, Registers 71, 72, 81, 82, 83, address select logic 73, memory 74, multiplexers 75, 76, 80, function decoder 77, arithmetic unit 78 and comparator unit 79. Decoder 70 receives its input from the analog comparators of FIG. 3 and in response thereto reads the appropriate correction $C_n$ into registers 71 and 72. Depending upon the actuating comparator decoder 70 reads either a $C_n = -16$ for very high, a $C_n = -1$ for high, a $C_n = 0$ for between high and low, a $C_n = +1$ for low or a $C_n = +16$ for very low into the CN registers. These corrections in turn are read into multiplexer 75 along with the slope limit $\Delta X_n$ and the output word currently being read out of memory 74. The output of memory 74 is read into multiplexers 75, 76 to generate an update signal for the next sweep and is also read into registers 82 and 83 to provide an output for controlling the IF preamplifier. Register 82 is a holding register and is clocked only once per sweep, when the first memory word is present on its input wires. 8 bit arithmetic unit 78 and logic 79 generate appropriate corrections that are fed back to the memory to correct the output for the next sweep. Unit 79 compares the slope increment $\Delta X_n$ with the limit on upward change of a slope and selects the limit if $X_n$ is exceeded. Multiplexer 80 provides for changing range scale. The update cycle operates once per half scan. Otherwise memory address is cycled and register 83 is clocked appropriately.

FIG. 5 illustrates the analog STC output stage of the circuit. It comprises digital/analog converters 85, 91, summing means 86, 92, bipolar reference 87, multiplexer drive 88, range scaling multiplexer 89, STC integrator 90, non-linear conversion amplifier 93, inverting amplifier 94, and pre-amp driver 95. Register 82 of FIG. 4 is read into digital/analog converter 91 and its output is summed with the integrated output of register 83 by summing means 92. The output of summing means 92 is then processed by amplifiers 93, 94 and preamp driver 95 for application to the IF preamplifier. Non-linear conversion amplifier 93 is provided to match non-linearity of gain control in the preamplifier.

Figure 7:
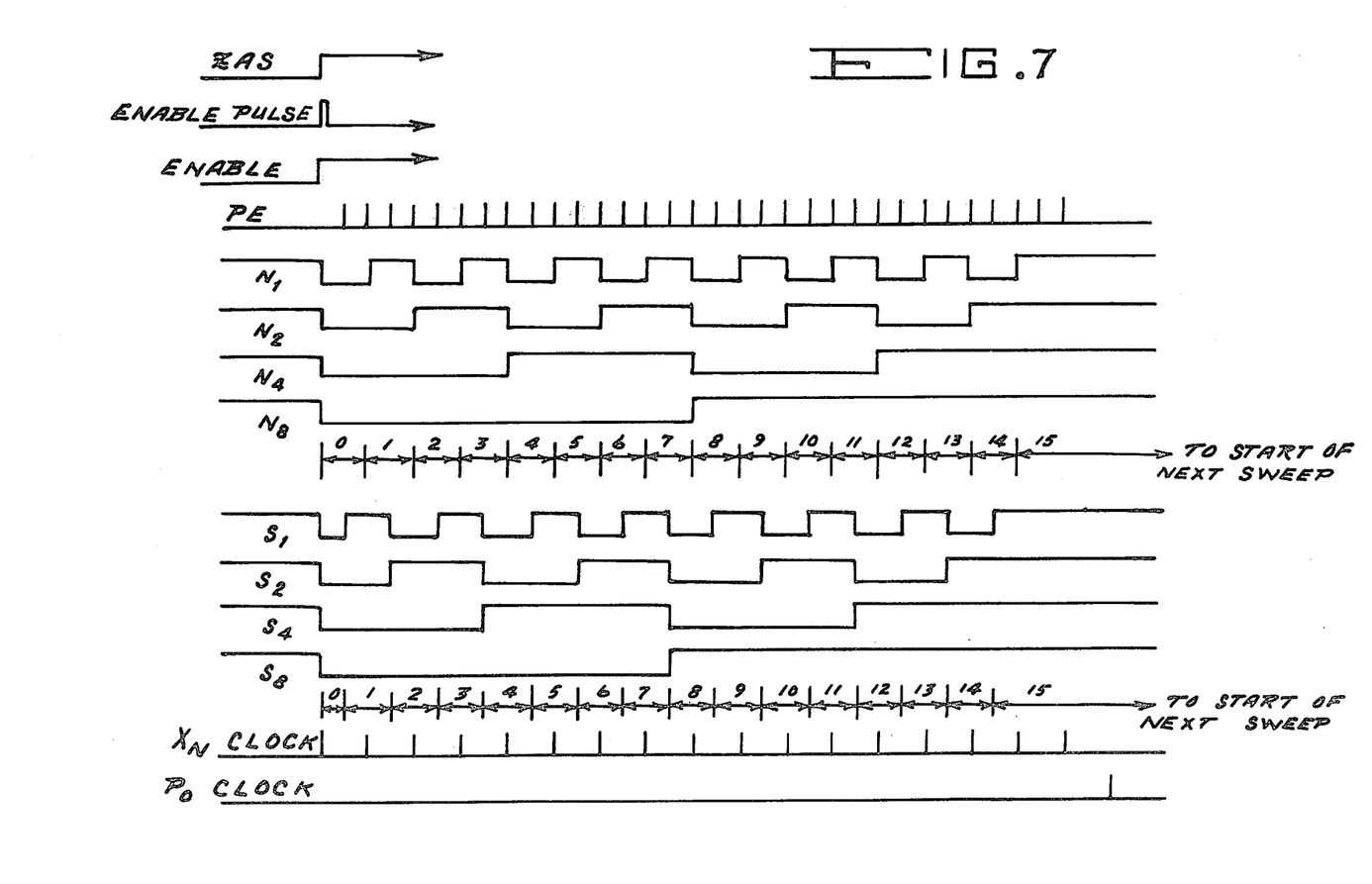
FIG. 7 is a timing diagram of the embodiment of FIGS. 3, 4 and 5.

FIG. 7 is a timing diagram for the above described circuits. Pulse trains $N_1$, $N_2$, $N_4$, $N_8$ relate to output bin numbers and pulse trains S1, S2, S3 and S4 relate to sample bin numbers.

While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. A sensitivity time control for radar receiving having signal processing means including, an input, a signal mixing means, an IF preamplifier and amplifier connected serially to the mixer, a logarithmic detector connected to the amplifier output and a video amplifier for processing the output of the logarithmic detector; the improvement comprising: means for monitoring and controlling the output of the video amplifier including a summing amplifier connected to the output of the video amplifier for producing a difference voltage; a plurality of integrating operational amplifiers connected to said amplifier; a plurality of first switches positioned between each integrating operational amplifier and the summing amplifier and a range counting means for sequentially operating said first switches in range related sequence, a plurality of threshold detectors connected to the output of the integrating operational amplifiers through a plurality of second switches operating in range related sequence, and a logic means connected to the output of said threshold detectors and operated in range related sequence and means for processing the output of said logic means for each range sweep whereby high threshold voltages will provide a decreased output and low threshold voltages will increase the voltage output, and means connecting the output of the processing means to the IF preamplifier of the radar receiver.

2. A sensitivity time control for radar receivers according to claim 1 wherein said means for processing the output of the logic means includes, a memory means connected to the logic means, a pair of parallel connected digital to analog converters connected to the output of the logic means, an integrating means connected to the output of one said converter and a summing amplifier connected to the output of the other converter and the integrating means whereby the output of the summing amplifier is connected to the IF preamplifier of the radar receiver.

* * * * *